Figure 1:
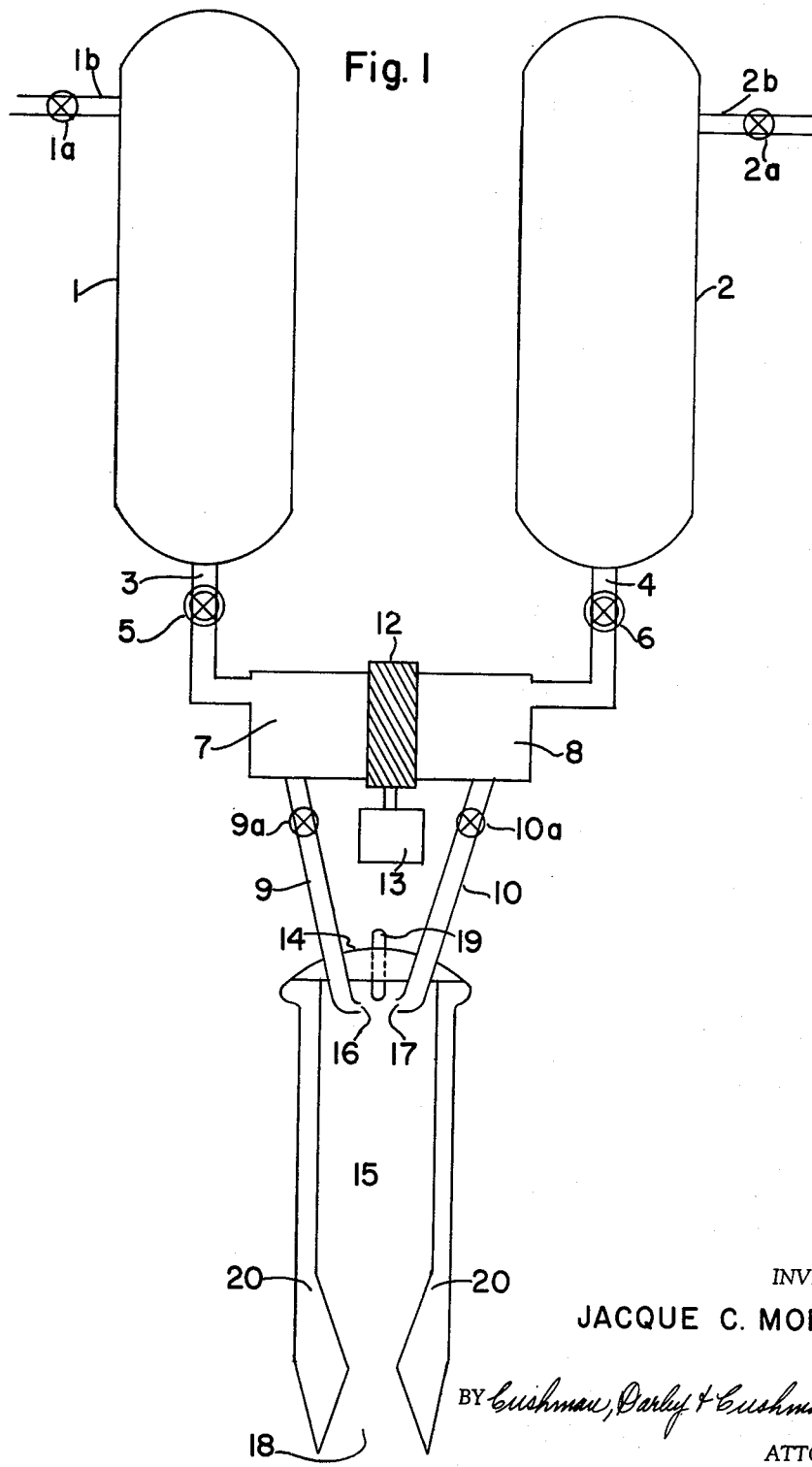

Oct. 27, 1964      J. C. MORRELL      3,153,902
LITHIUM ROCKET PROPELLANTS AND PROCESS FOR USING THE SAME
Filed April 4, 1961      3 Sheets-Sheet 3

INVENTOR
JACQUE C. MORRELL

BY Cushman, Darby & Cushman
ATTORNEYS

United States Patent Office 3,153,902
Patented Oct. 27, 1964

3,153,902
LITHIUM ROCKET PROPELLANTS AND PROCESS
FOR USING THE SAME
Jacque C. Morrell, 8 Oxford St., Chevy Chase, Md.
Filed Apr. 4, 1961, Ser. No. 100,755
18 Claims. (Cl. 60—35.4)

This invention relates to rocket propellant components and the process by which they are employed in the rocket engine for rocket powered flight.

In general rocket propellants consist of a number of fuels and oxidizers having suitable properties and which have been used by combining them with each other usually in pairs. One class of propellants in which the fuel and oxidizer are combined in a single composition are known as mono-propellants and these may be divided into single and double base compositions. The more generally and widely used class however employ two separate materials i.e. an oxidizer and a fuel and these are referred to in use as bi-propellant rocket systems. The latter are divided into two large classes designating generally their physical properties namely liquid propellants, and solid propellants. The liquid propellants that is the fuel and the oxidizer are stored in containers separately in the rocket system, whereas in the solid propellants the fuel and oxidizer are combined as solids in a single mixture of the two components in suitable shapes or forms for use in the rocket. Various combinations of the two systems while heretofore considered as a possibility have not generally been regarded as practical. The present invention relates particularly to liquid propellants and liquid bi-propellant rocket systems in which both the fuel and the oxidizer are employed in liquid form in the rocket engine system as a self-contained source of rocket power to propel the rocket in flight.

The liquid fuel which I employ is actually a unique composite but stable mixture which is made up by suspending finely divided lithium hydride which possesses high energy and other unique characteristics, and other related lithium compounds, in a selected liquid fuel preferably and generally of the class of liquid hydrocarbons, and preferably selected on a basis of density and other characteristics so that the resulting suspension of lithium hydride, and related lithium compounds in the hydride class, in the liquid hydrocarbon is stable both physically and chemically and possesses superior rocekt fuel properties. The oxidizers employed with my fuel are also liquid and may cover a wide range of substances such as liquid oxygen, fuming nitric acid, hydrogen peroxide, liquid ozone, liquid fluorine and others heretofore used successfully in the art but which when combined with my fuel gives results which are much superior of those otherwise obtained on a comparable basis. The bipropellant rocket systems used by me in connection with my invention are generally those which employ features which have been fully proven with conventional fuels, or practical variations thereof, but which are likewise on a selected basis. The overall improvement and results obtained comprise a novel bipropellant rocket system process, as well as a highly superior fuel giving greatly improved results when used in connection therewith; all of which will be more fully described and set forth hereinafter.

The rocket in general is a vehicle propelled by a combustion motor or rocket engine, which is self contained with respect to the fuel and oxidizer required for combustion and is thus independent of external means such as the atmosphere for supporting combustion. Rockets depend for their propulsion upon the ejection of hot gases produced by the combustion of the materials carried in the system i.e. the separate propellants consisting of the fuel and oxidizer. The rocket thus produces thrust by the reaction produced by the hot gases resulting from the combustion of the propellants. The latter are fed under pressure to a combustion chamber and are burned therein. The hot gaseous products of combustion escape with high velocity through the nozzle or throat of the chamber and thereby produces a powerful force equal and opposite to that of the jet which propels the rocket engine, and the frame, and in general the rocket thus overcoming starting inertia and resistance of the air to sustain flight. The force or thrust produced is generally constant which causes the rocket to be accelerated at a progressively higher rate, since the total weight of the vehicle is diminished as the propellants are consumed. The force may be expressed in various units such as pounds of force or rate of doing work such as horsepower, which is a measure of thrust and velocity, but the conventional measure for rockets is generally specific impulse i.e. the number of pounds of thrust produced per pound of propellant consumed per second. However there are other features of efficiency of bipropellants which will also be referred to below.

It is important to note that there are great differences between rocket engines and other types of internal combustion engines the principal one being that the former carry their own source of oxygen (as well as fuel), and therefore are independent of the atmosphere, and of altitude constituting in this respect an ideal power plant for use beyond the earth's atmosphere.

In its simplest form the rocket comprises the rocket engine, which generally refers to the combustion chamber and nozzle but which for present purposes may comprise as a rocket engine system the source of fuel and oxidizer i.e. the propellant tanks and the supply of the same together with feed means and accessories. The source and supply of fuel and oxidizer vitalize the process of power production in the combustion chamber and may therefore be considered an essential part of the rocket engine system. The air frame which generally includes all dead weight refers principally to the supporting structure, tubular housing and the like. The simple rocket is generally balanced for flight, but without guidance means. Control of the flight path of a rocket propelled vehicle may be obtained by various methods including swiveling the engine itself. If the system includes guidance means so that its trajectory or flight path may be altered by a mechanism within the rocket it is generally referred to as a guided missile. The latter generally contains electronic and optical devices, radar, television etc. for observation. Both may contain a war head. Generally anything beyond the bare essentials of flight is referred to as payload.

I may apply my invention to all of the above variations and may employ all of the known devices and refinements in connection therewith including multistage systems to obtain higher velocities and range. However in its essence my invention relates more specifically to the improved fuel described herein and to its application to improving the efficiency of the process of rocket engine systems; and more particularly of liquid bi-propellant rocket engine systems.

The elements of the rocket engine system required to carry out the process of my invention as well as the latter will be described in greater detail in connection with the drawings and the illustrative figures. However in general they comprise a source and supply of my composite lithium hydride-hydrocarbon fuel, and a separate supply of liquid oxidizer of the type referred to. The fuel and oxidizer are generally stored in tanks in the system, and gas pressure or pumps (and means for actuating the latter) to force the fuel and oxidizer on a controlled basis through jets into the combustion chamber wherein the mixture is ignited by ignition means to produce hot gases of combustion which are passed at high velocity through the nozzle or throat of the combustion chamber producing a high velocity jet stream which produces a thrust or force by reaction for propulsion of the vehicle. As pointed out previously the source and supply of the fuel and oxidizer vitalize the process of power production in the combustion chamber (and its utilization by the rocket for flight), and my special fuel particularly has an integral part in the improvements obtained in the process.

Having described my special fuel and the rocket engine and power plant system operation in which it may be employed in a general way, I shall proceed to a detailed description and discussion of the liquid fuel components of the propellant and the manner in which they are selected to prepare the composite fuel. The latter as pointed out is a composite consisting of a stable suspension of lithium hydride and other but non-equivalent substances such as lithium aluminum hydride and lithium boron hydride, in a hydrocarbon liquid or chemically stable derivative thereof. In this connection I may refer also to my copending application Serial No. 100,756 which relates to suspension of finely divided lithium metal (and alloys thereof) in special hydrocarbons to produce rocket fuels.

The paraffin hydrocarbons including the whole liquid series (and above in admixture) are preferred because of their complete non-reactivity with the lithium hydrides. Next in order are the cycloparaffins and the aromatics. Olefins are least desirable (as under some conditions they may react with the lithium hydride) but may be present in minor amounts. Certain hydrogenated hydrocarbons such as the hydronaphthalenes, e.g. tetra and deca hydronaphthalenes (commercially known as tetralin and decalin) and amyl naphthalene may also be employed. The properties of these compounds: Decalin, Deca hydronapthalene ($C_{10}H_{18}$), sp. g. 0.895; tetralin, tetra-hydronapthalene ($C_{10}H_{12}$), sp. g. 0.971 and amyl naphthalene ($C_{15}H_{18}$), sp. g. 0.965, as well as heavy solvent naphtha make them particularly attractive for blends in connection with suspensions of lithium aluminum hydride, and the heavier lithium compounds generally.

The paraffin hydrocarbons may vary over the whole range of liquid hydrocarbons and may be present in major amounts in the commercial products gasoline, naphthas, kerosene, the various jet fuels (JP1 to JP6 inclusive), diesel and domestic fuels and other higher boiling distillates all of which may be used either as such or preferably in various blends to meet the density and other requirements of my special composite lithium fuel as hereinafter described. The cycloparaffins occur mainly in the naphthene base oils or as narrow fractions of individual compounds, and are likewise suitable on a selected basis. The aromatic hydrocarbons derived from coal tar distillates, benzene, toluene, xylenes, cumene, are especially adapted because of density and specific gravity especially in admixture such as solvent naphtha which is a commercial fraction, and the middle oils. Some petroleum fractions also contain aromatic hydrocarbons. Various mixtures of these hydrocarbons may be employed also and it is to be noted that in the prevailing commercial natural petroleum products noted above from the various crude sources that the paraffins usually predominate, the naphthenes and aromatics are present to an extent dependent on source and processing, while the olefins (which are least desirable but can be used in minor amounts) are present only in cracked products: The other hydrocarbons are present of course in the cracked distillates, which may be used, preferably by blending with straight run petroleum or coal tar distillate products. In general all of the commercial products referred to above including gasoline, kerosene, the jet fuels, and the heavier distillates may be employed for my special fuel as they are sold in the open market, or blends thereof with each other, and the other products named above so that the density or specific gravity of the hydrocarbons are the equivalent, or approximately of the same order as lithium hydride sp. g. (0.76 to 0.80) e.g. 0.78, and to that of lithium aluminum hydride sp. g. 0.92 and with lithium boron hydride sp. g. 0.67. Normally the blends can be made on the basis of the products named above to be of equivalent specific gravity to the lithium hydrides, but variations of about ±0.1 while not desirable and generally avoidable may be allowable. However less than 0.1 variation in density is preferred, and exact equivalences may be obtained as described below, and quite readily to within ±0.05.

The commercial products gasoline, naphtha, the jet fuels (JP1, JP2, JP3, JP4, JP5 and JP6), kerosene, diesel fuels and burner distillates and heavier distillates such as gas oil become heavier in the ascending order shown. The heavier oils have less heating value by weight, but more by volume, than the lighter oils e.g. kerosene has about 3% less B.t.u. per lb. than gasoline but about 10% more by equal volume, and the others correspond. JP3 which is between gasoline and kerosene has a somewhat lower boiling range and a higher vapor pressure than kerosene. The jet fuels generally fall in between kerosene and gasoline in properties. The heat content of paraffin fuels such as gasoline is about 19,000 B.t.u. per lb., kerosene about 18,000, whereas the aromatic hydrocarbons with less hydrogen e.g. benzene runs about 17,200 B.t.u. per lb. The various products are also characterized by boiling range e.g. motor gasoline IBP<200° F. (usually 10% off at about 130° F.) end boiling point, 400° F., and vapor pressure about 8 lb. Reid, while kerosene may be characterized in boiling range varying from (a) 300° F. to 525° F. or (b) from 450° F. to 530° F. and a flash test of 140° F. The properties of JP3 would lie between gasoline and kerosene e.g. boiling range 300° F. to 460° F. Commercial distillate fractions up to 600° F. boiling range and above may be employed.

The above data are not given to precisely identify these products, as specifications vary considerably and are readily available, but are shown for comparative purposes. All of these products may be used particularly if blended to arrive at suitable specific gravities.

As an example kerosene has all of the advantages as a rocket fuel as gasoline with none of its operating disadvantages. Jet fuel JP4 (which is a low vapor pressure JP3) is superior in some respects to JP1 (similar to kerosene) but has less heat energy on a volumetric basis. Relatively small differences of the order shown while important when choosing between these fuels to be used alone, become of lesser importance than the selection of a hydrocarbon mixture e.g. obtained by blending, which has the proper density characteristic, (and also preferably of paraffinic type) to make a stable suspension of lithium hydride which will not settle and which contributes the necessary rocket fuel characteristics, in accordance with my invention.

The density (which is the weight per cubic centimeter), or the specific gravity (which is the relative weight of a definite volume compared with water at the same temperature) of the hydrocarbon mixtures varies with the fraction increasing generally with increasing boiling points. These mixtures contain a very large number of individual hydrocarbons; however from the practical viewpoint the commercial fractions are preferred because of availability; although it is a simple matter to blend any fraction in refinery practise to obtain the desired specific gravity.

From the viewpoint of the selection or use of a hydrocarbon product to make up a stable suspension of lithium hydride in hydrocarbon liquids, kerosene or the heavier jet fuels JP1 (or a blend of these) are satisfactory having densities or specific gravities of 0.791 to 0.796 while the other jet fuels are as follows in density—JP2—0.771 to 0.783; JP3—0.752 to 0.785, and JP4 falls between these ranges. JP5 and JP6 are variations in kerosene gasoline blends. A selection from kerosene, JP1 and the higher ranges of JP2 and JP3, or a blend of the latter with JP1 or kerosene would be satisfactory to make the suspension which would be stable without any stabilizing additive. It may also be stated that additions of small amounts of heavier distillates and/or of lighter distillates (e.g. gasoline to improve ignition) could be made to the suspension to correct for small differences or to improve certain properties such as ignition. Moreover heavier kerosene distillates (cut for example to 43 AP gravity) correspond to a density of sp. g. of 0.811. Domestic fuels (burning oils) have a density or sp. g. range of 0.850 to 0.855 and diesel oils from 0.839 to 0.860. These heavier oils may be blended with motor gasoline sp. g. about 0.74 in various proportions to arrive at the equivalent density of lithium hydride for example about 2 parts of heavy kerosene to one of gasoline or 1 part of gas oil or diesel oil to two of gasoline.

Also of the lower members of the cycloparaffin series have densities as follows: cyclohexane 0.778, cycloheptane 0.810 and cyclo-octane 0.8304. These could be used directly or blended with each other and would be suitable as suspending agents for lithium hydride. Moreover the naphthenic base crude oil or petroleum fractions could be cut to order to the 0.8 specific gravity of lithium hydride and make stable suspensions therewith.

The physical basis for preparing the suspension of lithium hydride is based on selection of the hydrocarbon primarily on specific gravity considerations (and in the case of olefin hydrocarbons if the concentration is too high possible reactivity), and emphasizing the use of commercial products is discussed above; as well as the various groups of hydrocarbons.

A description of the properties of the several lithium hydrides used in connection with my invention and the methods of preparation of the suspension in addition to that already given is shown below.

Lithium hydride is formed by direct combination of lithium with hydrogen (at elevated temperatures) and is an opalescent material normally with well defined crystals. It reacts vigorously with water, hydrolyzing to produce hydrogen, so that the hydrocarbons must be free, or reasonably so, of water. Lithium hydride is now commercially available and is utilized as a convenient source of hydrogen, and as a catalyst for many reactions and as a chemical raw material. It is extremely active and precautions must be taken in storing and handling it to avoid fire hazards. Also the material must be handled with caution by personnel and all protective devices employed for caustic and flammable materials must be employed. Grinding the material (or otherwise reducing) to fine powder (or finely divided condition) as required in the present invention must be done in a moisture free and preferably in an inert atmosphere such as dry nitrogen, argon, helium, etc. (carbon dioxide is reactive) and in an enclosed system. The same holds for filling containers. The bulk material while requiring care is much easier to handle. The finely divided lithium hydride e.g. from about several thousandths of a millimeter in diameter or less up to about 0.1 mm. more or less (the finer material being preferred), may be transferred to the hydrocarbon suspending agent or medium e.g. kerosene or a jet fuel of the appropriate density about 0.8 and the operation is carried out preferably in an inert atmosphere by stirring or agitating the finely divided lithium hydride into the hydrocarbon liquid. The smaller and more uniform range of sizes of the lithium hydride is preferred, but the upper ranges (or larger) will be stable also because of the density relationship. The hydrocarbon liquid is added in an amount to render the system fluid and so that the lithium hydride is in the internal phase; about 55 to 60% of liquid being required, although more may be added. It is also emphasized that various blends of hydrocarbons as shown above may be employed.

In some cases the lithium hydride may be made directly as a hydrocarbon dispersion in situ, by hydrogenation of lithium usually employing a suspending agent; but the density relationship of the hydrocarbon medium and the lithium hydride as pointed out is the important and determining factor to produce a stable suspension which depends according to my invention upon the correlation of the densities of external and internal phases.

Lithium aluminum hydride ($LiAlH_4$) another high energy fuel related to lithium hydride may also be employed by me in connction with the present invention. It may be prepared from lithium hydride in the conventional manner (reacting the same with an ethyl ether solution of aluminum chloride or preparing otherwise). It is a white solid, stable in air (because of formation of a coating of alumina) up to a temperature of 125° C. On thermal decomposition it produces lithium hydride, aluminum, and hydrogen and as a high energy rocket fuel possesses the superior qualities of each of these materials in a single compound. It is somewhat chemically more stable than lithium hydride and also, has a higher density or specific gravity namely 0.917. In preparing stable suspensions of lithium aluminum hydride in hydrocarbon fractions it is necessary to comminute or subdivide the same to powder form as with the lithium hydride but the hydrocarbon oil fractions (following my principle of substantially equivalent densities) must be of a heavier type for example domestic burner oils, gas oils and diesel oils and heavier distillates in the range of the commercial cuts 0.850 to 0.860 and higher. Also solvent naphtha (the aromatic, coal tar fraction) which is in this general density or specific gravity range (and even higher) namely 0.870 to 0.880 may be used or blends of those commercial hydrocarbon fractions named above as well as others in the same approximate density class e.g. the hydrogenated naphthalenes (0.895 to 0.965). I may also in some cases blend in some gasoline to improve ignition wherever desirable. It may also be noted since the lithium aluminum hydride is less reactive than the lithium hydride, that I may use substantially higher percentages of olefin hydrocarbons in the mixtures. I may also employ small fractions of the surface active materials named above to assist the suspension especially where the gap between the specific gravity of the hydrocarbons is greater than about 0.1 e.g. when employing gasoline or jet fuel JP3 or similar mixtures. In short I may employ all of the features of my invention to bring about the desired result; and making such blends as are necessary to do so.

In addition to the lithium hydride and the lithium aluminum hydride I may also employ on a non-equivalent basis lithium boron hydride $LiBH_4$ which is a very high energy fuel, generally prepared from lithium hydride and diborane ($B_2H_6$) or by any conventional method. It is a white solid with a melting point which exceeds 400° F. In making suspensions of lithium boron hydride the same principles are employed as already discussed. More specifically the hydrocarbon materials suitable for suspension of lithium hydride will be satisfactory for lithium boron hydride with minor adjustment by blending. The hydrides mentioned and similar derivatives may be referred to as the class of lithium hydrides although on a strictly non-equivalent basis. All of these compounds are affected or react strongly with water, but are otherwise more stable chemically than lithium hydride. The use of similar lithium hydride compounds where other metals or elements replace aluminum or boron may also be used by me on a non-equivalent basis.

I may also in some cases employ additives of surface active materials to assist in stabilizing the suspensions. These are generally of the type which is used in emulsion systems they would be soluble in the oil and the latter would be in the continuous phase. The may also be found in the class of hydrophobic esters, and are of a non-ionic type. Among this class are some of the fatty acid esters of the poly vinyl alcohols such as the glyceryl oleates, stearates and laurates. Also certain sterols and sterol esters, as well as penta aerythritol di-oleate and related soluble esters referred to as pentamuls may be used. Certain sterol esters of the type of cholesterol and lanolin have also been found useful in this connection, as well as compounds of the lecithin type. In another generalized class of suspending agents, to assist in special cases, where they are found desirable, are the soaps (i.e. the salts of the higher fatty acids) of the divalent metallic elements e.g. the oleates, stearates, palmitates, etc. of the alkaline earth metals, calcium, magnesium and borium. Corresponding lithium soaps on the one hand and aluminum soaps e.g. the octoate may also be used as examples.

These materials referred to above may be used when found necessary to the extent of a fraction of one percent up to several percent by weight and will not react in these dilutions with the lithium hydrides. Normally my suspensions of lithium hydrides do not require these additives, but they may assist even where used in very small amounts in special cases e.g. where light fractions are employed such as gasoline or other fractions the specific gravity of which are substantially lower than that of the lithium hydrides; or as an assistant in "wetting" the solid material with the oil if this should be necessary. I may also in special cases if desired employ relatively high concentrations of petroleum jelly, or the soaps, named in the oil to obtain stability by viscosity effects but this is considered only in unusual cases.

A principal requirement is that the systems must be fluid. Concentrations or in general amounts of lithium hydride up to 50% and above may be added, which in the present type of system where the specific gravity of the two phases i.e. the external or continuous hydrocarbon liquid and the dispersed lithium hydride are approximately the same, both by weight and volume, the latter having particular reference to the wetted material.

The amounts of lithium hydride which may be added to the hydrocarbon liquid depend on the degree of subdivision and uniformity of size; and these factors in turn determine void space which is likewise a factor. Moreover an excess of liquid must be present to obtain fluidity of the system which is necessary. On this basis the percentage of solid finely divided lithium hydride which may be added on a weight basis in practise would be from about 40% to about 50% of the resulting suspension. There is of course no lower limit and I may in some special cases add from several percent up to ten percent although generally these low concentrations would not be employed. Intermediate amounts for example from about 20% to about 40% could serve the useful purpose of substantial improvements in specific impulse and efficiency of performance while substantially maintaining the fluidity of the hydrocarbon liquid. The excess of liquid required to change from a stiff sludge like system to a fluid system is a relatively minor amount. While no difficulty in initial wetting of the powdered or finely divided lithium hydride is usually encountered, this may be overcome in special cases by adding a small fraction of one percent of the surface active materials referred to above.

Exact maximum amounts of lithium hydride in various states of subdivision which may be added to any particular hydrocarbon fraction or blend to produce any desired degree of fluidity and/or stability may in any event be readily determined by trial; and adjustments easily applied. The general principles described above which apply to the preparation of the lithium hydride suspensions also apply quantitatively to the amounts of lithium aluminum hydrides and lithium boron hydride from the viewpoint of the volumes suspended, but density and weights of the latter are proportionately greater.

The actual process of making up the suspension of the lithium hydride (as well as the other materials mentioned herein) is simply to stir the finely divided powdered material into the liquid hydrocarbons (or make a paste therewith and dilute with the hydrocarbons) and agitate or stir. The operation is carried out preferably in an inert atmosphere as mentioned previously.

According to my invention I may utilize all of the finely divided high energy solid fuels, i.e. the hydrides of lithium, including lithium hydride, lithium aluminum hydride, lithium boron hydride and the others mentioned above (none of which are in any sense equivalent to the others from the viewpoint of specific physical and chemical properties, or cost and availability etc.) In all cases they are suspended in finely divided form in a selected fraction of hydrocarbon liquids to produce a stable non-settling composite high energy liquid fuel: and as described they are used in combination with various liquid oxidizing compounds or agents of the class of liquid oxygen, liquid ozone (or mixtures), white and red fuming nitric acid, hydrogen peroxide (generally of high concentrations), liquid fluorine and various derivatives thereof e.g. chlorine mono and tri-fluoride nitrogen oxides and fluorides and other liquid oxidzing and similar agents generally known to the art. These oxidizing agents are now used conventionally and I contemplate employing all of these which have advantages and may be employed with and react with hydrocarbons in the absence as well as in the presence of the lithium hydrides; although the latter in all cases renders the hydrocarbons more reactive. In some cases also the presence of the suspended lithium hydrides gives a hypergolic action i.e. by auto ignition in the combustion chamber. In all cases improved results in rocket and rocket engine efficiency are obtained with my composite fuel compared with the same hydrocarbons used alone and the composite fuels are substantially non-settling both in storage and in use because of the substantially equivalent densities or specific gravities of the lithium hydrides and their respective hydrocarbon fractions in which they are suspended.

The operation of the process of my invention is carried out generally as described above and provides for two separate propellants consisting of a liquid fuel comprising a selected hydrocarbon liquid in which lithium hydride (or the other hydrides, lithium aluminum hydride and lithium boron hydride; and in some special cases lithium nitride) is suspended in a stable suspension (which is brought about mainly by consideration of the specific gravities of the two phases) and a liquid oxidizer of the type already referred to. These propellants are contained in separate tanks and are mixed only after separate injection into the combustion chamber; and otherwise are not allowed to come into contact with each other. The fuel and oxidizer may be fed separately to the combustion chamber by means of pumps or by gas pressure in the tanks.

Figure 2:
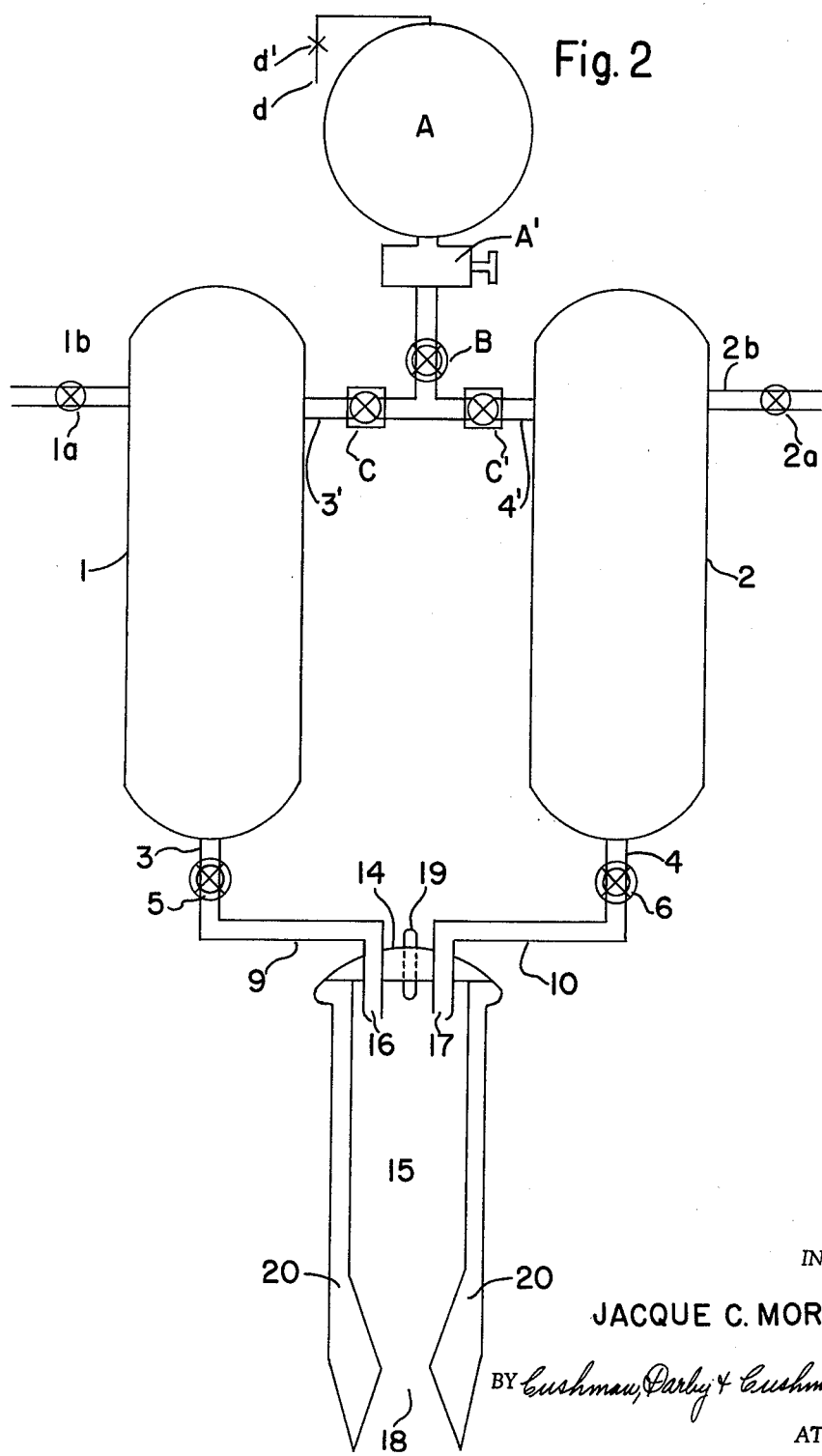
Figure 3:
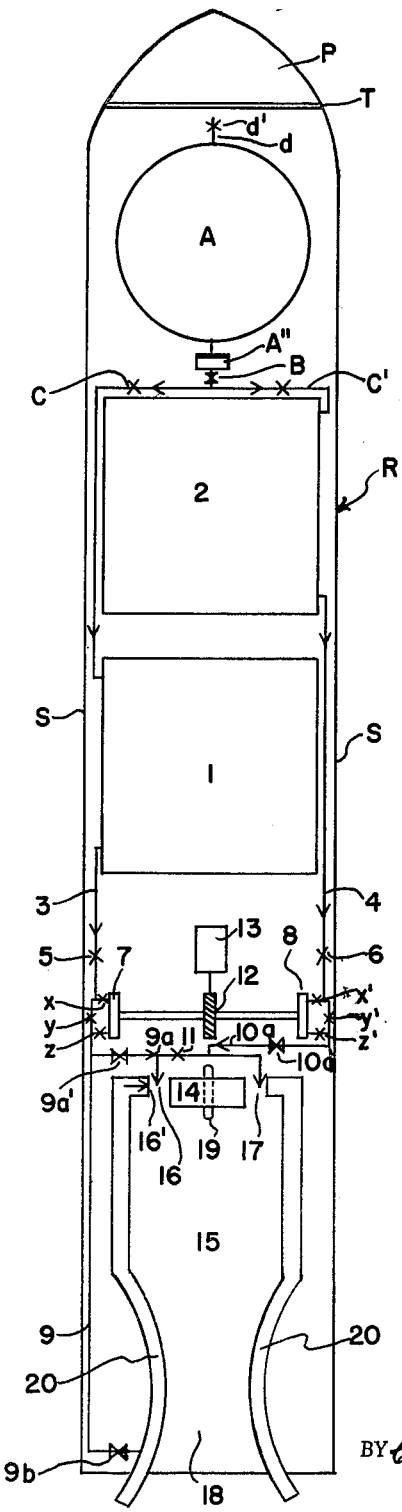

The FIGURES 1, 2, and 3, shown in the drawings are schematic and illustrative only but may be used to illustrate the operation.

Referring to FIG. 1 the special liquid composite fuel of the process is stored in tank or chamber 1, and the liquid oxidizer in tank 2. Valves and lines 1a and 1b and 2a and 2b provide for filling tanks 1 and 2 respectively with fuel and oxidizer. Line 3 provides for the withdrawal of fuel from tank 1 and line 4 for the withdrawal of oxidizer from tank 2. The rate of withdrawal of each liquid is controlled by main fuel control valve 5 and main oxidizer valve 6, located on the lines 3 and 4 respectively. The fuel passes through the pump 7 from which it is forced through line 9 with control valve 9a; simultaneously the oxidizer passes through pump 8, from which it is forced through line 10 controlled by valve 10a. The pumps 7 and 8 which are kept completely sealed off from each other (but are correlated to supply a definite proportion of oxidizer to fuel) are operated by the hot gas turbine 12 supplied from the gas generator 13. The latter may be a small combustion chamber, for example for a portion of the main propellants, or steam and or gas generator for example from the decomposition of hydrogen peroxide, or in any conventional manner. Lines 9 and 10 pass through the injector head 14 and terminate in the jets 16 and 17 respectively where the fuel and oxidizer are intimately mixed in the combustion chamber 15 and are ignited by suitable ignition means e.g. an electrical plug or hot plug generally (selected from a number of such devices in conventional use) shown as 19 and located in the injector head. The hot gases from the combustion chamber emerge as a high velocity jet stream and source of power through the chamber nozzle or throat 18.

The combustion chamber is usually provided with double walls with a space 20 between the same to permit circulation of a portion of one of the propellants to cool and protect the chamber wall from overheating and the propellant so circulated is returned to the main stream. This is illustrated in FIG. 3.

FIG. 2 shows most of the essential features shown in FIG. 1, the principal difference being that gas pressure feed system replaces the pump system shown in FIG. 1. The gas pressure feed system referred to as a gas pressurization system provides for feeding gas under suitable pressures from the storage sphere A to the propellant storage tanks in such manner so as to maintain a controlled flow and pressure on each of the propellant storage tanks. The gas employed must be chemically inert to the propellants (both fuel and oxidizer) and generally nitrogen, argon and helium are employed for this purpose. Provision is made for introducing the gas under pressure into the sphere through line and valve d and $d^1$. The gas is delivered from the gas storage sphere A through a regulator valve $A^1$ and through flow control valve B and check valves C and $C^1$ to the propellant tanks 1 for fuel and 2 for oxidizer where it pressurizes the space above the liquids in these tanks. The pressure regulator $A^1$ maintains the pressure and the flow uniform as predetermined for each liquid and is conventionally used for this purpose. Valve B to start and stop the flow of gas is operated by remote control and is generally of the solenoid electrically operated type. The check valves C and $C^1$ are required to prevent the vapors from the fuel tank and propellants generally from mixing in the gas feed system. The remainder of the system in FIG. 2 is substantially the same as for FIG. 1 excepting that no pumps and turbine etc. are required. Lines 1b and 2b and 1a and 2a are used for filling tanks 1 and 2 respectively. The fuel passes through line 3 controlled by valve 5 and the oxidizer through line 4 controlled by valve 6 into and through lines 9 and 10 respectively and through the injector head 14 to the jets 16 and 17 into the combustion chamber 15 where they are ignited by hot plug 19. The hot gases of combustion pass through nozzle or throat 18 as previously described. As shown in FIGURE 2 and as described in connection with FIGURE 1 the combustion chamber is usually provided with double walls with a space 20 between the same to permit circulation of one of the propellants to cool and protect the chamber walls from overheating, and the propellants so circulated is returned to the main stream.

In both FIGURES 1 and 2 as wells as in FIG. 3 to be described, and in general for all liquid propellant rocket systems solenoid valves of various types and remote control valves generally are used to control the main functions of rocket engines, employing various types e.g. one type for control of gas pressurization and another to control the action of the main fuel and the main oxidizer valves, and generally the latter are opened and closed at the same time. The pressure tank system requires high pressure in the propellant tanks, and in this respect the pump system has an advantage. In both systems safety and proper flow balances and means to control same are provided and these includes pressure regulators, remote control valves, check valves, and in some cases proportioning devices for fuel and oxidizer and various devices and refinements in conventional use for proper operation, and it is contemplated that I may use such devices in the operation of the process of my invention.

It is also to be understood that the FIGURES 1 and 2 are illustrative only.

FIGURE 3 likewise is for illustrative purposes, and shows schematically an assembly which includes both the gas pressure and pump feed systems. It is presented mainly to illustrate the housing and framework of the rocket in relation to the rocket engine and the flow of propellants therein. It is of course to be understood that the two feed systems namely the gas pressure and pump systems are not used simultaneously.

Referring to FIG. 3 the rocket R consists of the shell or frame which houses the propellant supply tanks and rocket engine with auxiliary parts, and the payload compartment P and tray or plate T. The payload compartment may include guidance or observational instruments, warhead or equipment as desired other than the rocket proper. In the schematic arrangement shown gas may be delivered under any suitable pressure as in FIG. 2 from storage sphere A through regulator $A^1$ and remote control flow valve B and check valves C and $C^1$ and passes into fuel storage tank 1 and into oxidizer tank 2 exerting pressure to force fuel and oxidizer through lines 3 and 4 respectively controlled by valves 5 and 6. When the gas pressure system is used the fuel valves x and z are closed and valve y is open; and similarly valves x' and z' in the oxidizer line are closed and y' is opened. Under the conditions the pump system is isolated, and fuel may pass directly through line 9a controlled by valve 9a' through the injector head 14 and to jet 16 and enter combustion chamber 15 or alternatively the fuel may pass through line 9 controlled by valve 9b into space 20 between the walls of the combustion chamber to cool the same and to emerge through jet 16' into chamber 15. The oxidizer flow passes simultaneously through line 10a controlled by valve 10a' passing through injector head 14 and terminating in jet 17 in the combustion chamber 15. Alternatively when valves x and z and x' and z' are opened and valves y and y' are closed the fuel may pass through pump 7 and the oxidizer through pump 8 (12 and 13 representing the turbine and gas generator shown in FIG. 1) flowing to the combustion chamber as already described above through the appropriate lines. In either case the mixture of fuel and oxidizer is ignited by hot plug 19 in combustion chamber 15 and hot combustion gases exit from nozzle or throat 18. Valve 11 provides safety in keeping fuel and oxidizer separate until they emerge from the separate jets into the combustion chamber.

RESULTS AND GENERAL EXAMPLES

One of the important standards of measurement in improved efficiency in the use of rocket fuels is the specific impulse i.e. the thrust in pounds per pound of fuel per second, measured usually in seconds. Specific combinations of fuels and oxidizers give different results which in general are not predictable. For example, on an approximate basis, gasoline with fuming nitric acid shows a specific impulse of about 240 seconds; with 90% hydrogen peroxide it shows about 250 seconds and with liquid oxygen, gasoline shows about 260 seconds, all at the same chamber pressure. With ozone or fluorine as oxidizers the specific impulse of gasoline may exceed 300 seconds. Different fuels also show different results among themselves, not generally predictable because of many variables, for example, gasoline is higher than ethyl alcohol using either hydrogen peroxide or liquid oxygen as an oxidizer; and further while ammonia gives slightly lower results than gasoline using fuming nitric acid as an oxidizer, it is quite superior when liquid fluorine is employed in both cases; although both are high. Hydrazine, a compound (somewhat chemically related to ammonia, but highly toxic) gives a higher specific impulse than any of the foregoing fuels using the same oxidizer. Liquid hydrogen and liquid fluorine give the highest specific impulse of any fuel-oxidizer combination, but are technically most difficult to handle in use since liquid hydrogen boils at —423° F. and liquid fluorine at —367° F. and the latter is both highly toxic and corrosive. Other examples could be cited but it is believed that the foregoing illustrates difficulties at attempts to predict as well as to use these materials.

Many factors influence the specific impulse which while not a basis for prediction give some indications and show a direction, especially where several factors for a given material cooperate with rather than opposing each other. Among the favorable factors which definitely affect specific impulse are high calorific value (B.t.u.'s per lb.); high combustion chamber temperatures (which do not necessarily follow calorific values); low molecular weights of the original materials and of the combustion products. As examples hydrogen has an extremely high calorific much higher than gasoline (perhaps higher than any other substance) but it shows a relatively low combustion chamber temperature (much lower than gasoline), either with oxygen or fluorine. Apparently the high calorific value together with the low molecular weight (the lowest) are sufficient to overcome, in this case, the low chamber temperature. The importance of the latter is that the hotter the gases the larger the volume occupied or the higher the pressure or both which results in greater thrust through the constant diameter nozzle of the combustion chamber. According to theory combustion chamber temperature is related to the breaking of valence bonds in the fuel and oxidizer during combustion and the formation of more stable bonds in the resulting gaseous products. It is known that in some reactions like the formation of steam from the combustion of hydrogen and oxygen consume energy in the decomposition of the resulting water at a definite temperature, and thus limit the combustion temperature. Low molecular weights of fuel and oxidizer and the resulting combustion products favor high specific impulse because of the large volume to weight relationship of the gaseous products. Whatever the particular explanation may be when two or more factors which strongly favor specific impulse are present at the same time the results as in the case of hydrogen may offset an unfavorable factor and vice versa, but in any event the factors must be determined.

With regard to the above general discussion it is noted and I have observed in connection with the present invention that while lithium (18,400 B.t.u. per lb.) and lithium hydride (17,500 B.t.u. per lb.) have calorific values of the same order of kerosene, jet fuel and gasoline i.e. of hydrocarbons generally, their combustion temperatures are very much higher than the hydrocarbons by several thousand degrees, and lithium boron hydride (which term is used equivalently here to lithium boro hydride) is much higher in both respects. Moreover lithium has an atomic weight of 6.95 the third lightest element (after hydrogen and helium) and the molecular weight of both lithium and lithium hydride (7.94) are correspondingly low so that in balance, they are good high energy fuel, i.e. they are practically equivalent to the hydrocarbons in one important respect and in two other important respects are greatly superior and impart their superior quality to the composite mixture. However heretofore no one has shown the manner in which these factors could be used to overcome certain objectionable properties, and the hazards attending the same, as well as to convert them into a physical form which can be practically applied and used as a superior rocket fuel such as has been accomplished by my novel product and process. The same statement is true of the other hydrides in respect of high combustion temperature, and even higher calorific (B.t.u.) values, and although not as favorable in the molecular weight factor as lithium and lithium hydride they are much more favorable when used according to my invention than most other fuels in general.

Rocket performance characteristics such as payload, range and size and weight of the rocket depend to some extent upon, and in general are related to all of the factors which enter into the specific impulse of which the thrust is an important factor. The latter is maintained uniform in operation, with constant consumption of propellants i.e. the fuel and oxidizer. As the latter are consumed the total load decreases and acceleration increases. The frame weight, as well as the rocket engine component parts, remains constant and improvements in payload depend not only on increasing the specific impulse as such, but any reduction in initial propellant and dead weight load which will permit substitution of payload will improve performance and efficiency for example reducing the oxidizer requirements.

I have found in connection with my invention that I obtain a very substantial decrease in oxidizer requirements, for which direct substitution of payload may be made; in addition to increased combustion chamber temperatures and an increase in specific impulse resulting in a substantial overall rocket engine and rocket efficiency when I employ my novel composite fuel consisting of a stable suspension of the lithium hydrides namely lithium hydride, lithium aluminum hydride and lithium boron hydride suspended in a selected hydrocarbon or a mixture of the same as described. Moreover my novel composite lithium rocket fuel is not only more efficient, but is stable and non-settling in storage and use and reduces the overall hazards in handling.

The above findings in connection with my invention demonstrate not only the superiority of the lithium hydrides as a high energy fuel but also disclose a novel composite fuel product and method of preparing the same so as to impart to it superior qualities for handling and use as a rocket fuel, as well as disclosing the manner in which they are employed i.e. the novel process by which these unique and superior rocket fuels (which have never heretofore been used in this manner) are used to obtain the advantages of their superior properties.

The conditions which may prevail in the combustion chamber of the rocket (without cooling) are temperatures from about 4000° F. to 8000° F. more or less and somewhat higher dependent on the propellant combinations; with pressures of from 300 p.s.i. to 500 p.s.i. and above dependent on several factors.

SPECIFIC EXAMPLES

*Example 1*

A JP2 jet fuel made by blending petroleum distillates in the specific gravity range of 0.773 and 0.785 averaging 0.78 is mixed with finely divided lithium hydride (employing the safety precaution of an atmosphere of nitrogen) using about 40% by weight of lithium hydride and 60% by weight of the petroleum distillate. The lithium hydride is first wetted with the petroleum distillate, and the remainder of the distillate added after which the mixture is stirred and agitated. A fluid suspension results which shows practically no tendency to settle on standing and may be considered permanently stable: No stabilizer was added or is needed.

The specific impulse of the hydrocarbon fuel component alone with oxygen as an oxidizer is about 255 seconds (pounds of force per pound of fuel per second); That of the above mixture (i.e. the hydrocarbon jet fuel and lithium hydride composite fuel) shows about 275 seconds under the same combustion conditions; an increase of about 8%. The oxygen fuel ($O/F$) ratio for the hydrocarbons alone is about 3.5:1 (using stoichiometric conditions) whereas the lithium hydride-hydrocarbon fuel composite on a comparable basis shows an oxygen fuel ratio of about 2.9:1 indicating a saving in oxidizer requirement of about 20%. Since the oxidizer could be as much as 30% to 50% of the total load weight of the rocket, this saving in oxidizer may be directly reflected in increased payload and range.

*Example 1a*

A heavy kerosene sp. g. 0.8 employing the same preparation conditions and percentage by weight of the hydrocarbon and lithium hydride components and as in Example 1 gave a practically permanent suspension (and using no stabilizer) shows substantially the same increase in specific impulse under the same conditions as Example 1 of about 7.5%; with an oxidizer requirement of about 18% less which may be reflected in an equivalent increase in payload and range.

*Example 1b*

The kerosene-lithium hydride composite fuel as in Example 1a employing fuming nitric acid or concentrated hydrogen peroxide as oxidizers instead of oxygen, shows lower specific impulses for both the hydrocarbon alone and the composite fuel than in Example 1 but in both cases the latter shows an increase in specific impulse and decreased oxidizer requirement corresponding to those shown in Example 1a. It is noted that the hydrogen peroxide fuel ratio is considerably greater than the oxygen fuel ratio which makes the actual weight saving greater.

*Example 1c*

A straight JP3 jet fuel in the high range of 0.785 when used instead of kerosene in Example 1a shows substantially the same results with respect to stability of the suspensions as well as rocket fuel characteristics as in 1a.

*Example 2*

55% by weight of a motor gasoline sp. g. 0.75, containing less than 0.5% of aluminum octoate as a stabilizer, and 45% by weight of very finely divided lithium hydride, made up otherwise as in Example 1, shows good stability with substantially no tendency to settle and is therefore considered as a permanent suspension, shows the following: (a similar mixture of the gasoline and lithium hydride without the stabilizer was considered sufficiently stable for practical use. Also shows the following results).

The specific impulse of the gasoline alone (at a somewhat higher combustion chamber pressure than in Example 1) using oxygen as an oxidizer is about 262 seconds; whereas the mixture of gasoline and lithium hydride shows a specific impulse of about 280 seconds; an increase of about 7%. The oxidizer requirement for the mixture is about 18% or less for the composite fuel than for the hydrocarbons which means that a correspondingly heavier payload may be carried equivalent to the reduced oxidizer requirement as explained in Example 1, and 1a increased range.

*Example 3*

A mixture of two parts of kerosene and one part of gasoline, the blend having a specific gravity of 0.79 is mixed, and in general prepared, as in Example 1 employing 45% of lithium hydride and 55% of the hydrocarbon mixture as shown in Example 2.

The specific impulse of the hydrocarbon mixture (under about the same conditions as in Example 2) is about 257 seconds and that of the hydrocarbon with the lithium hydride is about 275 seconds, an increase of about 7%; a decrease in oxidizer requirement of about 18% as in Example 2.

*Example 4*

A heavy petroleum distillate, in the class of burner distillate, light gas oils and diesel oils (to which a small amount of gasoline is added to improve ignition) having a specific gravity of 0.88 is mixed with lithium aluminum hydride ($LiAlH_4$), sp. g. 0.92 employing 40% of the latter by weight and 60% of hydrocarbon oil. The suspension is quite stable and shows substantially no settling for practical use without additive (use of the latter in a fraction of 1% shows no settling over very long periods). The hydrocarbon distillate alone has a specific impulse (with oxygen as oxidizer) of about 250 seconds; and the composite fuel with the lithium aluminum hydride shows about 270 seconds, an increase of about 8%. Oxidizer requirements are found to be reduced about 20%, which reduction in the total load is reflected quantitatively as shown in Example 1 but in increased payload and/or range. Increases of lithium hydride in the mixture show corresponding increases in efficiency.

*Example 4a*

Similar results to those shown in Example 4 may be obtained both in stability of the suspensions and in increased specific impulse as well as in reduced oxidizer requirements when (1) a heavy solvent naphtha (coal tar distillate), sp. g. 0.89 and hydrogenated naphthalenes referred to above sp. g. 0.895 to 0.97 (especially for stability) when the latter are blended to sp. g. 0.92 with either the petroleum distillates or the solvent naphtha or both shown in Examples 4 and 4a. The increase in specific impulse and reduction in oxidizer requirement with consequent increased efficiency are in general of the same values as 4 however, showing appreciably higher for the petroleum distillates and the hydrogenated naphthalenes due no doubt to greater hydrogen content.

*Example 5*

A petroleum distillate when used with lithium borohydride ($LiBH_4$) to the extent of 40% by weight of the latter in the composite fuel gives a stable non-settling suspension for practical use (rendered practically permanently non-settling on the addition of a fraction of 1% of the surface active additive). The increase in specific impulse (the hydrocarbons showed about 260 seconds) is somewhat greater than that shown in Example 4 about 277 seconds, an increase of about 9%. The reduction in oxidizer requirement is however somewhat less than about 10% which while not as large as the foregoing is quite substantial. The overall value of this composite rocket fuel because of high specific impulse however places it in the high energy class and in this important respect it is superior to the others. The use of solvent naphtha and hydrogenated naphthalenes also show results comparable to those indicated in Example 4.

The foregoing specific examples as well as the other examples shown herein of the application and use of my invention are not in any sense to be construed as limiting the same as they are only illustrative and there are many variations of the same within the broad scope and spirit of my invention.

I claim:

1. A high energy rocket propellant composition which comprises a substantially stable fluid suspension of a solid lithium compound in finely divided form in the internal phase in a combustible hydrocarbon liquid in the external phase, the said lithium compound being selected from the group consisting of lithium hydride, lithium aluminum hyride, and lithium boron hydride, said composition being further characterized in that any difference in specific gravity which may exist between the said hydrocarbon liquid in the external phase and the said suspended lithium compound in the internal phase is less than about 0.1.

2. A high energy rocket propellant composition which comprises a substantially stable suspension of a lithium compound in finely divided form in the internal phase in a hydrocarbon liquid in the external phase, the said lithium compound being selected from the group consisting of lithium hydride, lithium aluminum hydride, and lithium boron hydride, said composition being further characterized in that any difference in specific gravity which may exist between the said hydrocarbon liquid in the external phase and the said suspended lithium compound in the internal phase is less than about 0.05.

3. A high energy rocket propellant composition which comprises a substantially stable fluid suspension of a solid lithium compound in finely divided form in the internal phase in a combustible hydrocarbon liquid in the external phase, the said lithium compound being selected from the group consisting of lithium hydride, lithium aluminum hydride, and lithium boron hydride, said composition being further characterized by the specific gravities of the said hydrocarbon liquid and the said lithium compound being substantially equivalent to each other to prevent substantial settling of the said solid lithium compound.

4. A high energy rocket propellant composition which comprises a substantially stable fluid suspension of a solid lithium compound in finely divided form in the internal phase in a combustible hydrocarbon liquid from the group consisting of motor fuels, jet fuels, kerosene heavier distillate fuels solvent naphthas and hydrogenated naphthalenes and mixtures of the same in the external phase, the said lithium compound being selected from the group consisting of lithium hydride, lithium aluminum hydride, and lithium boron hydride, said composition being further characterized in that any difference in specific gravity which may exist between the said hydrocarbon liquid in the external phase and the said suspended lithium compound in the internal phase is less than about 0.1.

5. A high energy rocket propellant composition which comprises a substantially stable fluid suspension of finely divided solid lithium hydride in a mixture of hydrocarbon distillates selected from the class consisting of motor fuels, jet fuels, kerosenes, heavier fuel distillates, solvent naphthas and hydrogenated naphthalenes and mixtures of the same, the said hydrocarbon distillates being further characterized by having specific gravities in the range of about 0.72 to about 0.97.

6. A high energy rocket propellant composition which comprises a substantially stable fluid suspension of finely divided solid lithium aluminum hydride in a mixture of hydrocarbon distillates selected from the class consisting of motor fuels, jet fuels, kerosenes, heavier fuel distillates, solvent naphthas and hydrogenated naphthalenes and mixtures of the same, the said hydrocarbon distillates being further characterized by having specific gravities in the range of about 0.72 to about 0.97.

7. A high energy rocket propellant composition which comprises a substantially stable fluid suspension of finely divided soild lithium boron hydride in a mixture of hydrocarbon distillates selected from the class consisting of motor fuels, jet fuels, kerosenes, heavier fuel distillates, solvent naphthas and hydrogenated naphthalenes and mixtures of the same, the said hydrocarbon distillates being further characterized by having specific gravities in the range of about 0.72 to about 0.97.

8. A high energy rocket propellant composition which comprises a substantially stable fluid suspension of finely divided solid lithium hydride in a hydrocarbon liquid selected from the group consisting of motor fuels, jet fuels, kerosenes, heavier fuel distillates, solvent naphthas and hydrogenated naphthalenes and mixtures of the same, the said composition being further characterized by the difference in the specific gravities of the lithium hydride and the said hydrocarbon liquid being less than about 0.1.

9. A high energy rocket propellant composition which comprises a substantially stable fluid suspension of finely divided solid lithium aluminum hydride in a hydrocarbon liquid selected from the group consisting of motor fuels, jet fuels, kerosenes, heavier fuel distillates, solvent naphthas and hydrogenated naphthalenes, and mixtures of the same, the said composition being further charactized by the difference in the specific gravities of the lithium hydride and the said hydrocarbon liquid being less than about 0.1.

10. A high energy rocket propellant composition which comprises a substantially stable fluid suspension of finely divided solid lithium boron hydride in a hydrocarbon liquid selected from the group consisting of motor fuels, jet fuels, kerosenes, heavier fuel distillates, solvent naphthas and hydrogenated naphthalenes and mixtures of the same, the said composition being further character- ized by the difference in the specific gravities of the lithium hydride and the said hydrocarbon liquid being less than about 0.1.

11. In a liquid propellant rocket process to produce rocket engine power which comprises forcing a liquid fuel propellant from a bulk supply of the same to a rocket engine combustion chamber with a restricted nozzle, simultaneously forcing a liquid oxidizer propellant reactive with said liquid fuel propellant from a separate bulk supply to said combustion chamber wherein said fuel and said oxidizer are ignited and undergo combustion and from which the said gases of combustion pass through the said nozzle to producer rocket engine power whereby the rocket is propelled in flight, the improvement which comprises utilizing a stable suspension of a combustible solid lithium compound selected from the group consisting of lithium hydride, lithium aluminum hydride, and lithium boron hydride in finely divided form in a hydrocarbon liquid as the said fuel and the source of said power.

12. In a liquid propellant rocket process to produce rocket engine power which comprises forcing a liquid fuel propellant from a bulk supply of the same to a rocket engine combustion chamber with a restricted nozzle, simultaneously forcing a liquid oxidizer propellant reactive with said liquid fuel propellant from a separate bulk supply to said combustion chamber wherein said fuel and said oxidizer are ignited and undergo combustion and from which the said gases of combustion pass through the said nozzle to produce rocket engine power whereby the rocket is propelled in flight, the improvement which comprises utilizing a stable suspension of a combustible solid lithium compound consisting of lithium hydride in finely divided form in a hydrocarbon liquid as the said fuel and the source of said power.

13. In a liquid propellant rocket process to produce rocket engine power which comprises forcing a liquid fuel propellant from a bulk supply of the same to a rocket engine combustion chamber with a restricted nozzle, simultaneously forcing a liquid oxidizer propellant reactive with said liquid fuel propellant from a separate bulk supply to said combustion chamber wherein said fuel and said oxidizer are ignited and undergo combustion and from which the said gases of combustion pass through the said nozzle to produce rocket engine power whereby the rocket is propelled in flight, the improvement which comprises utilizing a stable suspension of a combustible solid lithium compound consisting of lithium aluminum hydride in finely divided form in a hydrocarbon liquid as the said fuel and the source of said power.

14. In a liquid propellant rocket process to produce rocket engine power which comprises forcing a liquid fuel propellant from a bulk supply of the same to a rocket engine combustion chamber with a restricted nozzle, simultaneously forcing a liquid oxidizer propellant reactive with said liquid fuel propellant from a separate bulk supply to said combustion chamber wherein said fuel and said oxidizer are ignited and undergo combustion and from which the said gases of combustion pass through the said nozzle to produce rocket engine power whereby the rocket is propelled in flight, the improvement which comprises utilizing a stable suspension of a combustible solid lithium compound consisting of lithium boron hydride in finely divided form in a hydrocarbon liquid as the said fuel and the source of said power.

15. In a liquid propellant rocket process to produce rocket engine power with comprises forcing a liquid fuel propellant from a bulk supply of the same to a rocket engine combustion chamber with a restricted nozzle, simultaneously forcing a liquid oxidizer propellant reactive with said liquid fuel propellant from a separate bulk supply to said combustion chamber wherein said fuel and said oxidizer are ignited and undergo combustion and from which the said gases of combustion pass through the said nozzle to produce rocket engine power whereby the rocket is propelled in flight, the improvement which comprises utilizing a stable suspension of a combustible solid lithium compound selected from the group consisting of lithium hydride, lithium aluminim hydride, and lithium boron hydride in finely divided form in a hydrocarbon liquid and further characterized by a difference in specific gravity between the said hydrocarbon liquid and the said lithium compound of less than about 0.1 as the said fuel and the source of said power.

16. In a liquid propellant rocket process to produce rocket engine power which comprises forcing a liquid fuel propellant from a bulk supply of the same to a rocket engine combustion chamber with a restricted nozzle, simultaneously forcing a liquid oxidizer propellant reactive with said liquid fuel propellant from a separate bulk supply to said combustion chamber wherein said fuel and said oxidizer are ignited and undergo combustion and from which the said gases of combustion pass through the said nozzle to produce rocket engine power whereby the rocket is propelled in flight, the improvement which comprises utilizing a stable suspension of a combustible solid lithium compound selected from the group consisting of lithium hydride, lithium aluminum hydride and lithium boron hydride in finely divided form in a hydrocarbon liquid the said hydrocarbon liquid being further characterized by its specific gravity falling within the range of about 0.72 to about 0.97 as the said fuel and the source of said power.

17. In a liquid propellant rocket process to produce rocket engine power which comprises forcing a liquid fuel propellant from a bulk supply of the same to a rocket engine combustion chamber with a restricted nozzle, simultaneously forcing a liquid oxidizer propellant selected from the group consisting of liquid oxygen, liquid ozone, white fuming nitric acid, red fuming nitric acid, nitric oxides, hydrogen peroxide, liquid fluorine, chlorine mono-fluoride, chlorine tri-fluoride and nitrogen fluorides from a separate bulk supply to said combustion chamber wherein said fuel and said oxidizer are ignited and undergo combustion and from which the said gases of combustion pass through the said nozzle to produce rocket engine power whereby the rocket is propelled in flight, the improvement which comprises utilizing a stable suspension of a combustible solid lithium compound consisting of lithium hydride, lithium aluminum hydride and lithium boron hydride in finely divided form in a hydrocarbon liquid, the said hydrocarbon liquid being further characterized by its specific gravity falling within the range of about 0.72 to about 0.97 as the said fuel and the source of said power.

18. In a liquid propellant rocket process to produce rocket engine power which comprises forcing a liquid fuel propellant from a bulk supply of the same to a rocket engine combustion chamber with a restricted nozzle, simultaneously forcing a liquid oxidizer propellant selected from the group consisting of liquid oxygen, liquid ozone, white fuming nitric acid, red fuming nitric acid, nitric oxides, hydrogen peroxide, liquid fluorine, chlorine monofluoride, chlorine tri-fluoride and nitrogen fluorides from a separate bulk supply to said combustion chamber wherein said fuel and said oxidizer are ignited and undergo combustion and from which the said gases of combustion pass through the said nozzle to produce rocket engine power whereby the rocket is propelled in flight, the improvement which comprises utilizing a stable suspension of a combustible solid lithium compound consisting of lithium hydride, lithium aluminum hydride, lithium boron hydride and lithium nitride in finely divided form in a hydrocarbon liquid and further characterized by a difference in specific gravity between the said hydrocarbon liquid and the said lithium compound of less than 0.1 as the said fuel and the source of said power.

References Cited in the file of this patent
UNITED STATES PATENTS 2,461,797    Zwicky _____ Feb. 15, 1949
2,771,739    Malina et al. _____ Nov. 27, 1956

OTHER REFERENCES

Leonard: Journal of the American Rocket Society, No. 72, December 1947, pp. 10 to 23, TL 780.A8., only page 21 relied on.